(12) United States Patent
Chen et al.

(10) Patent No.: US 11,288,809 B2
(45) Date of Patent: Mar. 29, 2022

(54) AUTOMATED DETECTION OF ARTIFACTS IN SCAN IMAGE

(71) Applicant: Seagate Technology LLC, Fremont, CA (US)

(72) Inventors: Zhiyu Chen, Eagan, MN (US); Ramprasath A. Prakash, Lakeville, MN (US)

(73) Assignee: Seagate Technology LLC, Fremont, CA (US)

( * ) Notice: Subject to any disclaimer, the term of this patent is extended or adjusted under 35 U.S.C. 154(b) by 91 days.

(21) Appl. No.: 16/868,252

(22) Filed: May 6, 2020

(65) Prior Publication Data

US 2020/0265583 A1 Aug. 20, 2020

Related U.S. Application Data

(62) Division of application No. 15/806,037, filed on Nov. 7, 2017, now Pat. No. 10,679,353.

(51) Int. Cl.
*G06T 7/13* (2017.01)
*G06T 7/55* (2017.01)
*G01Q 30/04* (2010.01)
*G01Q 60/30* (2010.01)

(52) U.S. Cl.
CPC .............. *G06T 7/13* (2017.01); *G01Q 30/04* (2013.01); *G06T 7/55* (2017.01); *G01Q 60/30* (2013.01); *G06T 2207/10028* (2013.01)

(58) Field of Classification Search
CPC ........... G06T 7/13; G06T 7/55; G06T 7/0004; G06T 2207/30168; G06T 2207/10056; G06T 2207/10028; G06T 2207/30148; G01Q 30/04; G01Q 60/30
See application file for complete search history.

(56) References Cited

U.S. PATENT DOCUMENTS

| 5,418,363 | A | 5/1995 | Elings et al. |
| 7,143,005 | B2 | 11/2006 | Dahlen et al. |
| 7,406,860 | B2 | 8/2008 | Zhou et al. |

(Continued)

OTHER PUBLICATIONS

Raghavan, D., et al. "Mapping polymer heterogeneity using atomic force microscopy phase imaging and nanoscale indentation." Macromolecules 33.7 (2000): 2573-2583. (Year: 2000).*

(Continued)

*Primary Examiner* — Vu Le
*Assistant Examiner* — Tracy Mangialaschi
(74) *Attorney, Agent, or Firm* — Kagan Binder, PLLC

(57) ABSTRACT

A method of analyzing an atomic force microscope image includes receiving data related to an atomic force microscope image, where the data includes at least a first channel of data and a second channel of data relating to a first and second image data type. The method also includes identifying at least a first location of high contrast within the image using the first image data type using edge detection and identifying a first artifact within the image based on the identified first location of high contrast. The method also includes accessing the second image data type corresponding to the identified first location of the first artifact and determining a type of the first artifact by comparing the first image data type with the second image data type relating to the identified location of the first artifact.

20 Claims, 8 Drawing Sheets

(56) References Cited

U.S. PATENT DOCUMENTS

| | | | |
|---|---|---|---|
| 7,489,407 | B2 | 2/2009 | Hill et al. |
| 7,515,305 | B2 | 4/2009 | Mizes |
| 7,684,956 | B2 | 3/2010 | Dahlen et al. |
| 7,770,231 | B2 | 8/2010 | Prater et al. |
| 7,770,439 | B2 | 8/2010 | Mininni |
| 8,646,109 | B2 | 2/2014 | Hu et al. |
| 8,739,309 | B2 | 5/2014 | Hu et al. |
| 8,881,311 | B2 | 11/2014 | Raschke et al. |
| 9,134,340 | B2 | 9/2015 | Humphris |
| 9,150,415 | B2 | 10/2015 | Zhou et al. |
| 9,535,085 | B2 | 1/2017 | Stan et al. |
| 9,588,136 | B2 | 3/2017 | Hu et al. |
| 2007/0251306 | A1* | 11/2007 | Zhou ............ G01Q 40/00 73/105 |
| 2008/0174784 | A1 | 7/2008 | Colonna De Lega et al. |
| 2015/0247881 | A1 | 9/2015 | Su et al. |

OTHER PUBLICATIONS

Pan, Xiao. "Processing and feature analysis of atomic force microscopy images." (2014). (Year: 2014).*

Dorobantu, Loredana S., et al. "Atomic force microscopy measurement of heterogeneity in bacterial surface hydrophobicity." Langmuir 24.9 (2008): 4944-4951. (Year: 2008).*

Velegol, Stephanie B., et al. "AFM imaging artifacts due to bacterial cell height and AFM tip geometry." Langmuir 19.3 (2003): 851-857. (Year: 2003).*

Velegol, Stephanie Butler. "AFM: Imaging Artifacts." Dekker Encyclopedia of Nanoscience and Nanotechnology, Seven vol. Set . CRC Press, 2014. 73-82. (Year: 2014).*

Taatjes, Douglas J., et al. "Quality assessment of atomic force microscopy probes by scanning electron microscopy: correlation of tip structure with rendered images." Microscopy research and technique 44.5 (1999): 312-326. (Year: 1999).*

"Atomic-force microscopy", Wikipedia, retrieved on Mar. 8, 2017 from https://en.wikipedia.org/wiki/Atomic-force_microscopy, (17 pages).

Franois Riguet, Gwyddion Tutorial #1, available at http://gwyddion.net/presentations/tutorial-Gwyddion-basic-data-correction-Francois-Riguet-2012.pdf, (13 pages).

Ando et al., "High-speed atomic force microscopy for observing dynamic biomolecular processes", J. Mol. Recognit. Sep. 27, 2007; 20: pp. 448-458, (11 pages).

Haugstad, Greg. "Overview of Atomic Force Microscopy." de Atomic Force Microscopy (2012), (18 pages).

Ando et al., "High-speed Atomic Force Microscopy for Nano-visualization of Dynamic Biomolecular Processes", Progress in Surface Science 83, pp. 337-437 (2008), (130 pages).

Ukraintsev et al., "Artifacts in Atomic Force Microscopy of Biological Samples", Atomic Force Microscopy Investigation nto Biology—From Cell to Protein, pp. 29-54, 2012, (27 pages).

Taatjes et al., "Quality assessment of atomic force microscopy probes by scanning electron microscopy: correlation of tip structure with rendered images", Microscopy research and technique, vol. 44, pp. 312 326, 1999, (15 pages).

Pan, "Processing and feature analysis of atomic force microscopy images" Master Theses, 7268, 2014, (55 pages).

Velegol, "AFM: Imaging Artifacts" Dekker Encyclopedia of Nanoscience and Nanotechnology, Seven Volume Set pp. 73-82, 2014, (10 pages).

Velegol et al., "AFM imaging artifacts due to bacterial cell height and AFM tip geometry", Langmuir, vol. 19, pp. 851-857, 2003, (7 pages).

Raghavan et al., "Mapping polymer heterogeneity using atomic force microscopy phase imaging and nanoscale indentation". Macromolecules, vol. 33, pp. 2573-2583, 2000, (11 pages).

Dorobantu et al., "Atomic force microscopy measurement of heterogeneity in bacterial surface hydrophobicity", Langmuir, vol. 24, pp. 4944-4951, 2008, (8 pages).

West et al., "A Guide to AFM Image Artifacts", Pacific Nanotechnology, Inc., (12 pages). (2002).

Fantner, "Atomic Force Microscopy", Advanced Bioengineering Methods Laboratory, École Polytechnique Fédérale De Lausanne, (34 pages). (2013).

Chen et al., "Enhancement and recovery in atomic force microscopy images", (18 pages). (2013).

Klapetek et al., "Gwyddion user guide", available at http://gwyddion.net/documentation/user-guide-en/, (184 pages). (2009-2016).

* cited by examiner

AUTOMATED DETECTION OF ARTIFACTS IN SCAN IMAGE

RELATED APPLICATIONS

This application is a divisional patent application of nonprovisional patent application Ser. No. 15/806,037 filed on Nov. 7, 2017, wherein said nonprovisional patent application is incorporated herein by reference in its entirety.

BACKGROUND

Sliders for use in hard-disk drives can be manufactured to extremely precise tolerances, including down to single-digits of Angstroms ($1 \times 10^{-10}$ meters). In addition, the hardness and smoothness of slider surfaces can make them challenging to assess using metrology processes. Atomic force microscopy (AFM), also known as scanning-force microscopy (SFM), has emerged as a high-resolution type of scanning probe microscopy (SPM), used to assess the quality and precision of sliders after manufacture. AFM can produce images that have a substantially higher resolution than optical metrology technologies, making it desirable for metrology of various slider surfaces, including slider air bearing surfaces.

SUMMARY

In a first aspect of the present disclosure, a method of analyzing an atomic force microscope image includes receiving data related to an atomic force microscope image, where the data includes at least a first channel of data and a second channel of data relating to a first and second image data type. The method also includes identifying at least a first location of high contrast within the image using the first image data type using edge detection. The method also includes identifying a first artifact at the first location of high contrast within the image based on the identified first location of high contrast. The method also includes accessing the second image data type corresponding to the identified first location of the first artifact. The method also includes determining a type of the first artifact by comparing the first image data type with the second image data type relating to the identified location of the first artifact.

In another aspect of the present disclosure, a system can be configured to analyze an atomic force microscope image. The system can include a probe, a cantilever portion, a tip portion, a light source, a position sensitive detector and a processor. The processor can be configured to perform steps that include receiving data related to an atomic force microscope image, where the data includes at least a first channel of data and a second channel of data relating to a first and second image data type. The processor can also be configured to perform a step of identifying at least a first location of high contrast within the image using the first image data type using edge detection. The processor can also be configured to perform a step of identifying a first artifact at the first location of high contrast within the image based on the identified first location of high contrast. The processor can also be configured to perform a step of accessing the second image data type corresponding to the identified first location of the first artifact. The processor can also be configured to perform a step of determining a type of the first artifact by comparing the first image data type with the second image data type relating to the identified location of the first artifact.

In a second aspect of the present disclosure, a method of analyzing an image includes receiving an image having a first scan direction, the image including at least a first sub-image containing data relating to a first image aspect and a second sub-image containing data relating to a second image aspect. The method also includes identifying at least a first pixel location based on a first gradient feature of the first sub-image. The method also includes accessing, based on the first pixel location, the second sub-image. The method also includes substituting the second channel sub-image for the first channel sub-image for the first pixel location. The method also includes analyzing, based on the accessing and substituting, an image aspect perpendicular to the first scan direction at the first pixel location. The method also includes determining, based on the analyzing, at least one local perpendicular gradient variance at the first pixel location. The method also includes identifying a maximum local perpendicular variance for the first pixel location.

In another aspect of the present disclosure, a system can be configured to analyze an atomic force microscope image. The system can include a probe, a cantilever portion, a tip portion, a light source, a position sensitive detector and a processor. The processor can be configured to perform steps that include receiving an image having a first scan direction, the image including at least a first sub-image containing data relating to a first image aspect and a second sub-image containing data relating to a second image aspect. The processor can also be configured to perform a step of identifying at least a first pixel location based on a first gradient feature of the first sub-image. The processor can also be configured to perform a step of accessing, based on the first pixel location, the second sub-image. The processor can also be configured to perform a step of substituting the second channel sub-image for the first channel sub-image for the first pixel location. The processor can also be configured to perform a step of analyzing, based on the accessing and substituting, an image aspect perpendicular to the first scan direction at the first pixel location. The processor can also be configured to perform a step of determining, based on the analyzing, at least one local perpendicular gradient variance at the first pixel location. The processor can also be configured to perform a step of identifying a maximum local perpendicular variance for the first pixel location.

In a third aspect of the present disclosure, a method of analyzing an atomic force microscope image includes scanning a surface using an atomic force microscope, where the scanning outputs data including at least a first channel and a second channel of data relating to a first and second image data type. The method also includes identifying at least a first location of an anomalous surface feature within the image using the first image data type. The method also includes identifying a first artifact at the first location of the anomalous surface feature within the image based on the identified first location of the anomalous surface feature. The method also includes accessing the second image data type corresponding to the identified first location of the anomalous surface feature. The method also includes determining a type of the first artifact by comparing the first image data type with the second image data type relating to the identified location of the first artifact.

In another aspect of the present disclosure, a system can be configured to analyze an atomic force microscope image. The system can include a probe, a cantilever portion, a tip portion, a light source, a position sensitive detector and a processor. The processor can be configured to perform steps that include scanning a surface, where the scanning outputs data including at least a first channel and a second channel of data relating to a first and second image data type. The processor can also be configured to perform a step of identifying at least a first location of an anomalous surface feature within the image using the first image data type. The processor can also be configured to perform a step of identifying a first artifact at the first location of the anomalous surface feature within the image based on the identified first location of the anomalous surface feature. The processor can also be configured to perform a step of accessing the second image data type corresponding to the identified first location of the anomalous surface feature. The processor can also be configured to perform a step of determining a type of the first artifact by comparing the first image data type with the second image data type relating to the identified location of the first artifact.

DETAILED DESCRIPTION

Figure 1:
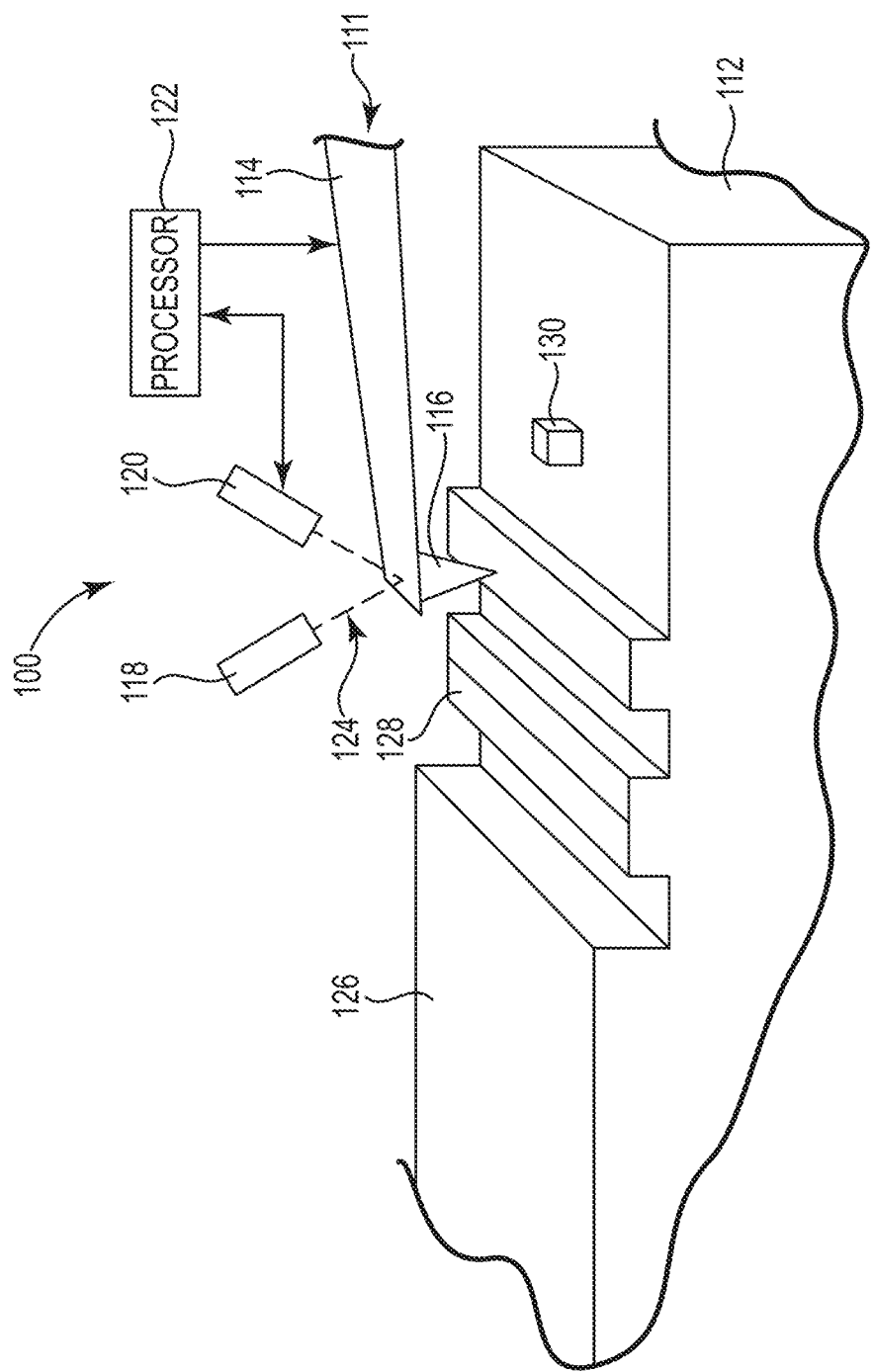
FIG. 1 is a perspective view of an example AFM apparatus, according to various embodiments.

The present disclosure relates to improvements to image processing and analysis, and relates more particularly to automated detection and image quality classification based on atomic force microscope (AFM) imaging artifacts. Based on fundamental insights into the physical instabilities that can cause artifacts during image processing, described methods and systems can identify the existence of image artifacts. Described methods and systems can also use multiple channels of AFM image data corresponding to multiple image data types to identify artifacts and classify the type of artifacts detected.

AFM images can be generated through various processes, including one or more complex convolutions based on tip-sample interactions. A topographical assessment can be performed to manufactured sliders during and/or after a completion of manufacture (e.g., individual sliders, sliders in bar form, or an entire wafer) using an AFM scan having a surface topographical data channel. AFM images can be created using a tapping or a static AFM mode. A tip-sample interaction topography assessment can determine the presence of artifacts on slider surfaces, but scanning errors and actual contaminants being present can be lumped into a single, over-inclusive result. Generally, an artifact can be defined as a defect in an image that appears as a result of technology or methods used to create and process an image. Therefore, an artifact, as used herein, can include both digital defects and/or physical defects in various cases. The result can be over-inclusive in part because some artifacts may be instrument related, and some artifacts may be process related. Therefore, artifacts in fast scan AFM images commonly can include false positives, leading to inefficiency in image analysis and slider handling and management.

In many cases, excessive surface non-uniformity, in the form of peaks and valleys in topography, material differences, and probe manufacturing variances, can presently render imaging optimization ineffective. For example, at times an AFM probe tip sliding over and evaluating a slider surface can hit a bump or dip into a trough on the surface, causing a temporary tip overload or discontinuity, leading to imperfections in the resulting image. These imperfections are commonly referred to as "streak" artifacts. Thus, these and other imaging artifacts are typical in AFM metrology.

Although artifacts have long been present in AFM images, AFM scanning techniques have been increasingly made to be high-speed in order to evaluate a large number of surfaces. With the advent and proliferation of "fast scan" AFM technology, thousands of images (or more) can now be produced per day in a single facility. As AFM scanning machines have become more efficient, some have come to be known as "fast scan" AFMs, but as AFMs have become faster, some artifacts and contaminants have become more problematic in AFM images. Various artifacts can presently be confused for harmful contaminants found on a surface being measured, often leading to reading uncertainties and false positives of the presence of contaminants during image classification and evaluation. The large quantity of precisely-scanned AFM images that are produced can be followed by manual screening by highly-trained image specialists for false positive artifacts. This can be inefficient due in part to the volume of scanned images and also the high cost of trained specialists has risen. Therefore, a strong desire exists for a reliable and automatic option for commercial AFM image artifact screening.

In some examples, an AFM surface topography scan image can be displayed as a bitmap grid to show relative topographies of the surface being evaluated. Embodiments of the present disclosure can identify streak artifacts in the surface topography scan, types of artifacts that can commonly be found in fast scan AFM images. Embodiments of the present disclosure can also distinguish these streak artifacts from actual contaminant artifacts that can sometimes be found on substrates such as wafers, slider bars, and individual sliders. Based on these, image quality can be assessed more accurately and efficiently.

Artifacts of various forms are commonly found in fast scan AFM images. One type of artifact commonly found in AFM images is a streak artifact. Artifacts in AFM images can represent either actual contamination of a disk surface, or can represent a false positive artifact resulting from the fast scan nature of some AFM scanning techniques. The present disclosure refers to AFM image artifacts as streaks and/or artifacts interchangeably, but a streak artifact is one type of many image artifacts.

The present disclosure is directed to methods and structures for identifying and classifying artifacts present in an AFM image according to artifact type, whereby the quality of the image containing such artifacts can itself then be automatically be classified as "good," "bad," or other classification. Bad in the context of the present disclosure and AFM images can denote a false positive, AFM apparatus or process related artifact, or can denote actual contamination found on a disk surface during the AFM scan. Good in the context of the present disclosure can denote a lack of artifacts found in the image being assessed. Embodiments of the present disclosure are directed to analyzing bad quality AFM images and determining whether contaminants are found on surfaces being scanned.

FIG. 1 is a perspective view of an example AFM 100 apparatus, according to various embodiments. AFM 100 represents an example of a physical setup and apparatus that can be used to carry out embodiments of the present disclosure.

As shown, AFM 100 is positioned over a surface of structure 112. AFM 100 can be a fast scan AFM. The present disclosure applies in particular to fast scan AFM images, which may suffer from a higher prevalence of false positive streak artifacts, but the present disclosure can also apply to other forms of AFM and other topographic scanning processes. AFM 100 can be configured for a dynamic or "tapping" intermittent-contact mode where a cantilever portion 114 is vibrated at a set frequency and responses are measured. For a tapping mode configuration, an AFM image can be produced by tracking and imaging the force of the probe tip 116 at various intermittent contact with the structure 112.

Alternatively, AFM 100 can be configured for a "static," constant contact force mode where a probe tip 116 is dragged over a surface of structure 112. For a static mode, a deflection of cantilever portion can be evaluated continuously or at various intervals. In various embodiments, a feedback loop using a processor 122 can be used to adjust separation of a probe 111 support, holder structure (not shown) and a structure 112. An output feedback from a signal related to the deflection of the cantilever portion then corresponds to the surface topography of the structure 112 to a high degree of precision and a small degree of error. Examples of structures 112 to be evaluated by AFM 100, as contemplated herein, include wafers, sliders, and slider bars, magnetic reading and recording systems, and various portions and components thereof.

As shown, AFM 100 includes a probe 111 having a cantilever portion 114 and a tip portion 116. Tip portion 116 can be very sharp and can be designed to be replaceable when determined to be worn, whether due to performance degradation or due to age. AFM 100 also includes a light source 118, a position sensitive detector 120, and processor 122. Light source 118 emits a beam 124 that is reflected by cantilever 114 and received by a position sensitive detector 120. Processor 122 is configured to receive signals from the position sensitive detector 120 and can provide and/or transmit signals to control movement of probe 111 relative to the structure 112.

In one embodiment, structure 112 is a pole tip region of a magnetic recording system, including slider 126 carrying reader structure 128 and writer structure 130. Various AFM techniques described herein can be useful for measuring and imaging feature characteristics of structure 112, such as pole tip recession (PTR) features of a reader structure 128 and a writer structure 130 located on structure 112. It should be noted that structure 112 is shown merely as an example for purposes of illustration, and the AFM techniques described herein are also useful for measuring and imaging nanometer and micrometer scale surface features of many other structures. For example, the AFM techniques may also be used to measure feature characteristics in other magnetic recording device structures, such as cavity transition features, among others.

AFM 100 is configured to measure physical characteristics or properties of structure 112, such as feature dimensions and surface finish. Such measurement is commonly referred to as surface metrology. Probe tip 116 is positioned in very close proximity (e.g., within picometers) to the surface of structure 112 to allow measurements of structure 112 over a small area. Probe tip 116 can be moved relative to structure 112 using extremely precise positioning. For example, processor 122 may control motion of probe 111 such that probe tip moves along the surface of stationary structure 112. Alternatively, processor 122 may control a device such as a tube scanner to move structure 112 while probe 111 remains stationary. As probe tip 116 moves over the surface of structure 112, features on the surface of structure 112 can cause cantilever 114 to bend in response to the force between probe tip 116 and structure 112.

A position sensitive detector 120 can measure the amount of deflection in cantilever 114. The measured amount of deflection of cantilever 114 can be used to generate an image or other digital representation of structure 112. In particular, light source 118 (e.g., a laser) reflects light beam 124 off of cantilever 114 to the position sensitive detector 120. Position sensitive detector 120 may include (e.g., two, four, etc.) side-by-side photodiodes such that the difference between the signals generated by the photodiodes indicates the position of light beam 124 on position sensitive detector 120, and thus the angular deflection of cantilever 114. An angular deflection of cantilever 114 at a point in time can act as a proxy for the corresponding surface of structure 112 being measured. Because the distance between cantilever 114 and position sensitive detector 120 is generally thousands of times the length of cantilever 114, the motions of probe tip 116 are greatly magnified, yielding the high precision of AFM.

As discussed herein, an example slider has little-to-no contaminants on it (including operative or active surfaces, in terms of electrical connections and/or aerodynamic properties, among others) following manufacture. However, due to the size of contaminants and the nature of slider fabrication, some sliders generally are found to have at least some presence of contaminants of various slider surfaces. During assessment, contaminants can sometimes be distinguished from streak and other artifacts when screened manually by skilled specialists, but existing techniques have run into challenges in distinguishing contaminants on slider surfaces that are being evaluated from mere artifacts symptomatic of limitations in AFM scanning technologies. Artifacts can be problematic during screening, as contaminants are harmful and artifacts can appear as contaminants, leading to excessive false positives and slider attrition during screening. Disclosed embodiments include methods and systems configured to identify and distinguish streak artifacts from contaminants, thus improving computer-based AFM image evaluation and classification.

Figure 2:
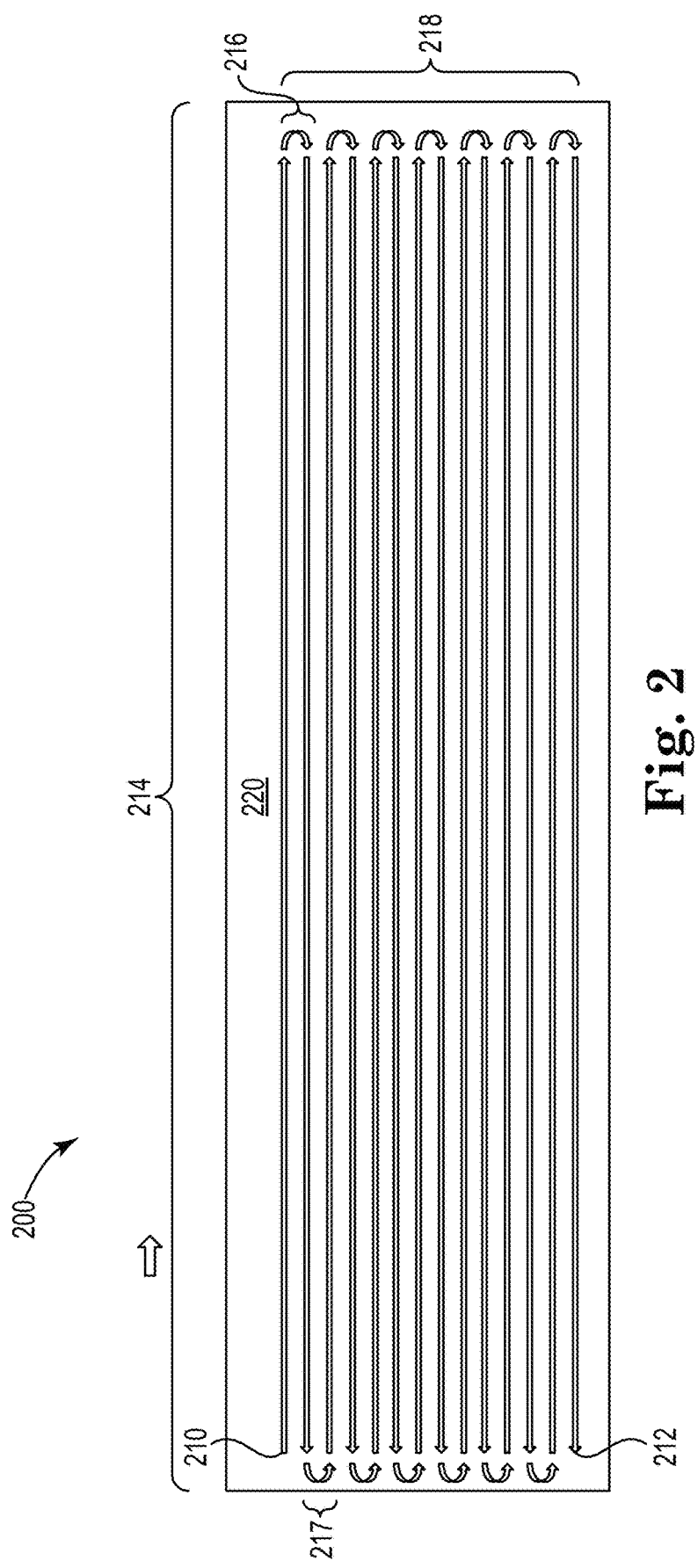
FIG. 2 is a schematic representation of a fast scan AFM scan path as an AFM scans a surface of a structure, according to various embodiments.

FIG. 2 is a schematic representation of a fast scan AFM scan path 200 as an AFM scans a surface 220 of a structure 112, according to various embodiments.

Improving upon speeds found in previous AFM scanning systems, fast scan AFM systems (e.g., AFM 100 of FIG. 1) can produce scanned AFM images corresponding to slider surfaces at a rate of thousands of slider surface images per day, or more. Although linear scan speed (of individual scan lines) has substantially increased in recent years, various scanning challenges become more prominent as AFM scan speed increases. In order to achieve these desired fast scan AFM scan rates, various portions of surface 220 can be scanned at various speeds, with some surface 220 portions scanned at very high rates and some surface 220 portions scanned at much lower speeds. Example AFM scan speeds can be in the range of 1 mm/s or more.

The shown AFM scan path 200 can be configured to cover an entire surface 220 of structure 112 with scan lines, and the scan path 200 can start at various portions of surface 220. As used herein, scan lines can denote various straight line portions of scan path 200. A scan start point 210 can be located at a corner or end of surface 220. Scan path 200 is not shown to scale, and the scan path 200 may include little to no gaps between various AFM scan passes (shown as left-to-right and right-to-left). As shown, scan 200 starts at start point 210 near or at the top left corner of surface 220. As shown, AFM probe of FIG. 1 then proceeds across distance 214 at a high rate of linear scan speed before reaching the rightmost edge of surface 220, where the scanning device (e.g., probe 116) slows at or before return point 216, shifting a small (e.g., one line width) vertically, and proceeding across distance 214 of surface 220 in a reversed (right-to-left) direction. Upon scan reaching a point horizontally similar to start point 210, a second return point 217 of the AFM scan can occur. The AFM scan then can repeat the back-and-forth scanning across surface 220 along a vertical distance 218 of surface 220, and the scan path 200 and final scan line can end vertically below the start point 210. Alternatively, the scan path end point 212 can be located at a horizontally-opposite end of surface 220 from start point 210.

The AFM scan and the various scan line example return points 216, 217, among others, can involve a slower AFM scan rate at and near these return points 216, 217, leading to a lower propensity to speed-related errors, especially errors manifested as streak artifacts in the corresponding AFM image. However, during a scanning process across distance 214, the AFM scanning may proceed at a very high rate of speed, tending to lead to a relatively high propensity for certain types of AFM image scan artifacts. Artifacts can be caused by a probe tip temporarily leaving a usable scan range, where scanning data can be omitted and a scan image can include a region of no usable data.

Figure 3:
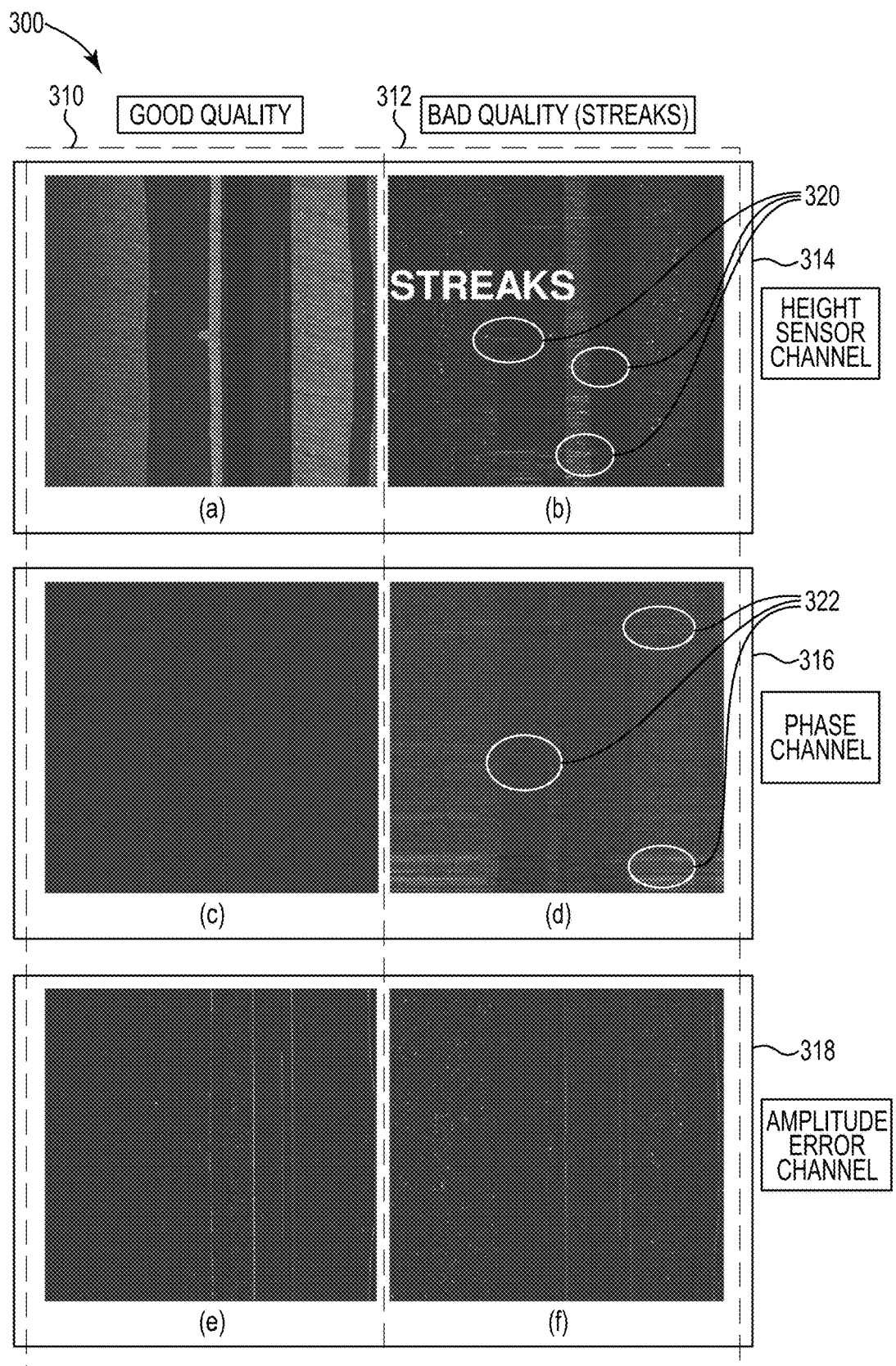
FIG. 3 is a side-by-side visual comparison of AFM images and channels of data relating thereto that do or do not contain streak artifacts, according to various embodiments.

FIG. 3 is a side-by-side visual comparison 300 of AFM images and channels of data relating thereto that do 312 or do not 320 contain streak artifacts, according to various embodiments.

Fast scan AFM images, once produced, have historically been manually and individually screened by highly-trained image analysis specialists in order to identify false positive image artifacts, for example artifacts that do not relate to contaminants on the relevant disk surface. As disclosed, herein, fast scan AFM images can now also be processed and analyzed by machines (e.g., computer-controlled systems and the like) in order to determine various details and features of AFM images and corresponding surfaces 220 of structures 112. In cases where false positives may be present, embodiments of the present disclosure can determine and categorize streak artifacts as being contaminant based or simply AFM artifacts that may not be harmful. Artifacts, such as streak artifacts, may not necessarily denote contaminants on the slider surface 220, from hard and soft contaminants, which can have a negative slider performance impact. One goal of this disclosure is to not only identify artifacts automatically by machine, but also to automatically distinguish artifacts due to AFM processing from actual contaminants on a surface 220, a significant breakthrough in efficiency and cost savings. In other words, instead of producing a quantity of AFM images that may or may not contain surface contaminants, the present disclosure can narrow down AFM images with artifacts into problematic and non-problematic examples.

Still with reference to FIG. 3, three channels of AFM data types are shown, including a first data type height sensor channel 314 (with associated streak artifacts 320), a second data type phase channel 316 (with associated streaks 322), and a third data type amplitude channel 318. Streak artifacts 320 usually do not show in the amplitude error channel 318 image. Streak artifacts 320 usually appear in both height sensor channel 314 and phase channel 316 as high-contrast pixels aligned in horizontal (scan direction) lines, but may not typically appear in the amplitude error channel 318. High-contrast can be assessed using various known edge detection methods and pixel contrast methods, among others. In some embodiments, a high-contrast location in an image can be defined as a sub-region of the image that includes one or more groups or "blobs" of pixels having highly different gray-level values (e.g., brightness level). Gray-level values of pixels can be similar within blobs, but highly different between different blobs.

Example methods of detecting high-contrast locations in an image can include: 1. calculating the gradients of pixel gray-level values and gray-level difference between adjacent pixels. High gradient can indicate high contrast; 2. calculating the gray-level variance within an image sub-region. High gray-level variance can indicate high contrast; and/or 3. other suitable edge detection methods. There are various kinds of edge detection methods. Edge detection methods generally employ edge detection filter kernels to detect edges in an example image. Edge detection kernels can aim to identify pixels in the image at which point the image brightness (e.g., gray-level value) changes sharply (e.g., has discontinuities). Edge detection methods, as used herein, generally are employed to identify pixels with high gradients and/or high contrast.

However, hard contaminants can appear in all three example channels (314, 316, 318), and the hard contaminants may not be aligned in lines. Therefore, in order to differentiate streak artifact pixels from hard contaminant pixels, according to various embodiment, high-contrast pixels can be identified in the amplitude error channel 318 as hard contaminants. Next, the high-contrast pixels in the phase channel 316 image corresponding to the hard contaminant locations can be removed. Finally, the high-contrast pixels remaining in the phase channel 316 are likely evidence of streak artifacts. In this way, streak artifacts 320 can be isolated and identified in the phase channel 316 image.

Good quality images 310 and bad quality (artifact containing) images 312 are shown for each of the shown three image data type channels. Using one or more (e.g., three, as shown) channels of AFM data types, a first channel (e.g., topography or height channel 314) can include data related to a first assessment of overall surface imperfections. Next, where imperfections are found a second channel (e.g., second data type, phase channel 316) can be used to further and more precisely classify the type of artifact or contaminant. A third channel (e.g., third data type, amplitude error channel 318) can also be employed for even greater precision, such as a confirmation of data found in the other channels. Topography or height channel 314, as used herein, can denote a map of constant-force gradient. Phase channel 316, as used herein, can denote a map of dissipative tip-sample (probe-surface) forces. Amplitude error 318, as used herein, can show efficiency of proportional-integral-derivative (PID) controls to a set-point, according to various embodiments.

In embodiments, based on input image data, and channelized AFM image data relating to the image data types, Boolean operations can be used to classify good and bad quality images. The classification can be based on findings of evidence of streak artifacts with respect to the height sensor channel 314 (topography), phase channel 316, and amplitude error channel 318 to identify the existence of artifacts based on the image data types. Images without substantial or harmful contaminants can have an expected range for amplitude error 318 and phase 316, permitting classification. The expected range for the various channels can be preset according to control specimens known to have certain conditions. In some embodiments, various algorithms can apply a sequence of morphological operations to further classify artifacts and images according to artifact features, readings, and attributes.

Initially, high-contrast pixels of an AFM image can correspond to any type of artifact. High-contrast pixels corresponding to different types of artifacts usually appear in different combinations of image channels as listed in Table 1, below. For example, streak artifacts 320 can appear in both a topography (height sensor) channel 314 and a phase channel 316, but not the amplitude error channel 318. Hard contaminants can appear in all three example channels (314, 316, 318). Therefore, types of artifacts can be differentiated and identified using Boolean combinations of high-contrast pixels between different channel images. For example, in order to identify streak artifacts 320, high-contrast pixels corresponding to streak artifacts 320 can be present in the phase channel 316, and are typically not be present in the amplitude error channel 318. The high-contrast pixels can be aligned in horizontal lines (e.g., corresponding to a scan direction). Thus, in order to identify hard contaminants, the corresponding high-contrast pixels can be present in all three example channels (314, 316, 318), and according to various embodiments, are generally not aligned in straight lines.

and distinguishing detected visual surface anomalies as being fast scan AFM artifacts (e.g., streak artifacts) versus various forms of actual contamination, which can be injurious to a system in terms of read/write performance.

According to an embodiment of process 400, at operation 410, data can be received (or scanned using an AFM) that is related to an AFM image. The image data can include a first and second channel of data relating to a first and second image data type. Following operation 410, at least first location of high contrast (or an anomalous surface feature) within the image can be identified at operation 412 using the first type of data using, e.g., edge detection, or the like. In embodiments, where a possible artifact or contaminant is detected, a coordinate location within the scanned surface image can be stored. By accessing the storage location, a subsequent scan can be performed vertically (perpendicular or transverse to the original scan line direction) at various positions of detected artifacts. According to some embodiments, no subsequent vertical AFM scan is performed, and the AFM data (multi-channel image) is generated by scanning the imaging area line by line once in the scan (horizontal) direction.

The perpendicular scan can then determine or assess, e.g., vertical contrast and features in order to determine whether a vertically-significant contaminant particle is present, or whether a transversely-narrow streak artifact due to a fast horizontal scan is instead being detected. In embodiments, a streak artifact may be characterized as being very short vertically (perpendicular direction) relative to the horizontal direction of the detected artifact, whereas a contaminant may have a comparable vertical and horizontal dimension, making identification and classification by machine practical according to the present disclosure.

TABLE 1

| Artifact Type | Impact | Detection Method | Topography/ Height sensor Channel | Amplitude Error Channel | Phase Channel |
| --- | --- | --- | --- | --- | --- |
| Interference | 30% yield | Boolean with periodicity filter | Present | Not Present | Present |
| Streak artifacts | 40% yield | Boolean with local variance filter + line detection | Present | Not Present | Present |
| Contamination/ buildup (hard) | | Boolean with local variance filter + blob detection | Present | Present | Present |
| Contamination/ buildup (soft) | | Boolean with local variance filter + blob detection | Present | Not Present | Present |

According to one aspect (illustrated and described with respect to FIG. 2), a fast scan AFM may read horizontally very fast, and vertically only intermittently. In some cases, the horizontal and vertical axes (and associate qualities and characteristics) can be reversed, which can lead to predominantly vertical streak artifacts 320 and scan lines instead of horizontal streak artifacts and scan lines. In this case, vertical streak artifacts 320 can be present due to fast vertical probe movement and associated scan lines instead of fast horizontal probe movement during a fast scan AFM process.

Figure 4:
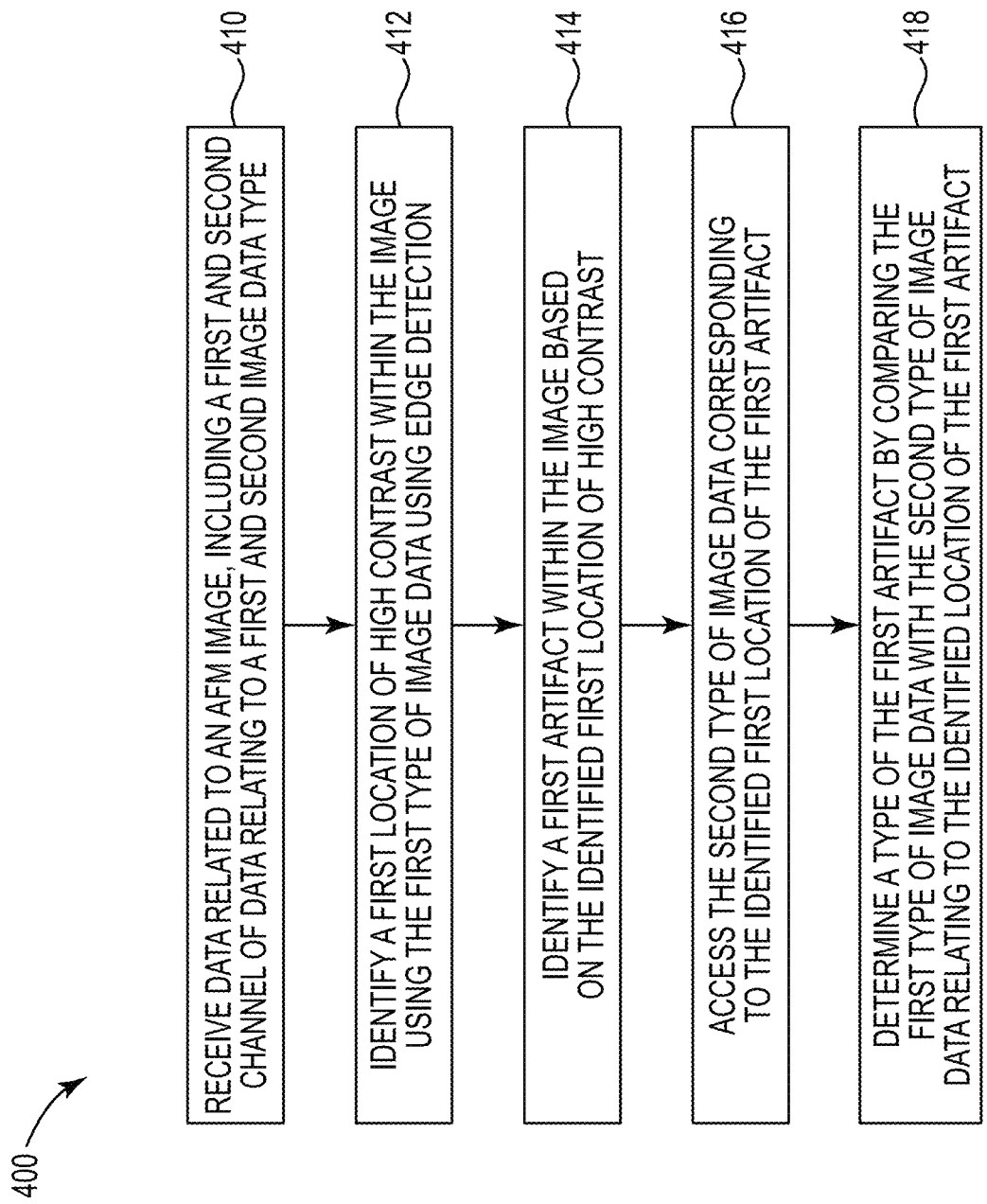
FIG. 4 is a flowchart of a process for analyzing an image, according to various embodiments.

FIG. 4 is a flowchart of a process 400 for analyzing an image, according to various embodiments.

In one example of horizontal linear AFM fast-scans (e.g., as shown in FIG. 2), a method of analyzing an AFM image can include various operations that can be performed by a controller or system. The method can include identifying After the at least one first location of high contrast (or anomalous surface feature in some embodiments) has been identified at operation 412, a first artifact can be identified based on the first location of high contrast (or anomalous surface feature) within the image at operation 414, based on the identified first location of high contrast (or anomalous surface feature). During operation 414, the identification of the first artifact can include determining that an artifact or contaminant is present, but may not include a determination of the type of contaminant or artifact.

Following the identifying the first artifact at operation 414, the second image data type corresponding to the identified first location of the first artifact can be accessed at operation 416. By accessing the second image data type, greater detail of the contaminant or artifact can be received for analysis, including cross-analysis where a finding according to one image data channel can be used to trigger an access of a second image data channel. Following the accessing of the second image data type at operation 416, a type of the first artifact can be determined by comparing the first image data type with the second image data type relating to the identified location of the first artifact at operation 418. For example, a peculiar or anomalous finding in a topography/height channel (e.g., 314 of FIG. 3) of an image can indicate a possibility of an AFM-apparatus related streak artifact or a contaminant. Following the height channel finding, a phase channel (e.g., 316 of FIG. 3) can be consulted at the same location of the possible streak artifact, and based on a comparison of the two (or more) channels of image data, various conclusions or inferences can be drawn regarding the type and significance of the detected anomaly.

The process may then end, or may optionally include receiving or scanning further image data including a third channel of data relating to a third image data type. Upon the receiving of the third channel of data, the type of the first artifact can be determined by comparing the first and second types of image data with the third image data type.

Figure 5:
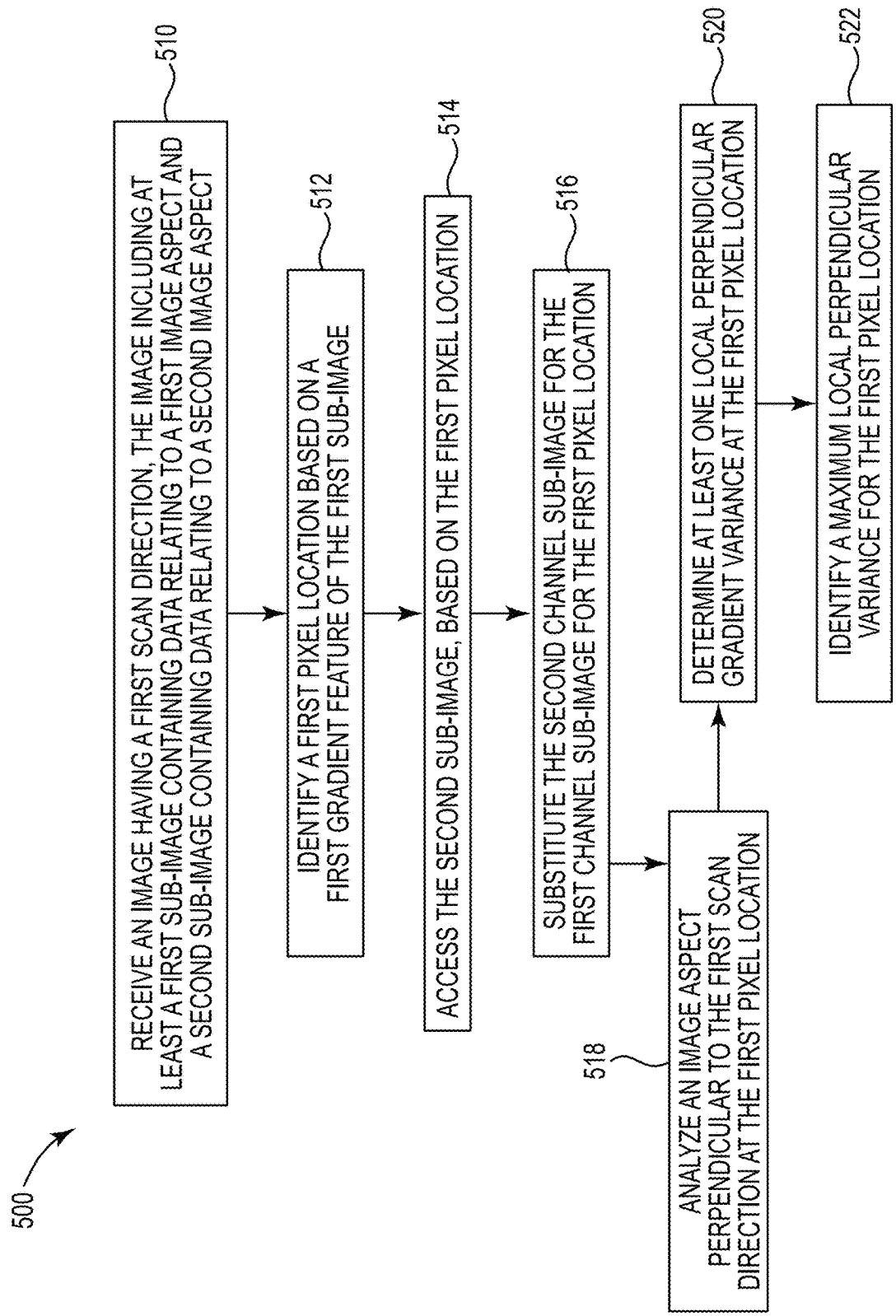
FIG. 5 is a flowchart of another process for analyzing an image, according to various embodiments.

FIG. 5 is a flowchart of another process 500 for analyzing an image, according to various embodiments.

According to process 500, an image (or data relating thereto) to be assessed or analyzed can be received at operation 510. The image can be an AFM image and can have a first scan direction, and at least a first sub-image containing data relating to a first image aspect (e.g., topography/height data of image) and a second sub-image containing data relating to a second image aspect (e.g., phase data of image). At least a first pixel location can then be identified at operation 512, based on a first gradient feature (e.g., a feature of high contrast or other anomalous surface feature) of the first sub-image. Following operation 512, the second sub-image can be accessed at operation 514 based on the first pixel location identified at operation 512.

After accessing the second sub-image at operation 514, the second channel sub-image can be substituted at operation 516 for the first channel sub-image for the first pixel location (e.g., an x-y coordinate). After the substituting of operation 516, an image aspect perpendicular or transverse to the first scan direction can be analyzed at the first pixel location at operation 518. Following operation 518, at least one perpendicular gradient variance can be determined at the first pixel location at operation 520. In response to the determining at operation 520, a maximum local perpendicular gradient variance at the first pixel location can be identified at operation 522. According to some embodiments, notable or substantial gradient variances generally can be equated and/or associated with locations of high contrast or otherwise anomalous surface feature pixels.

Figure 6:
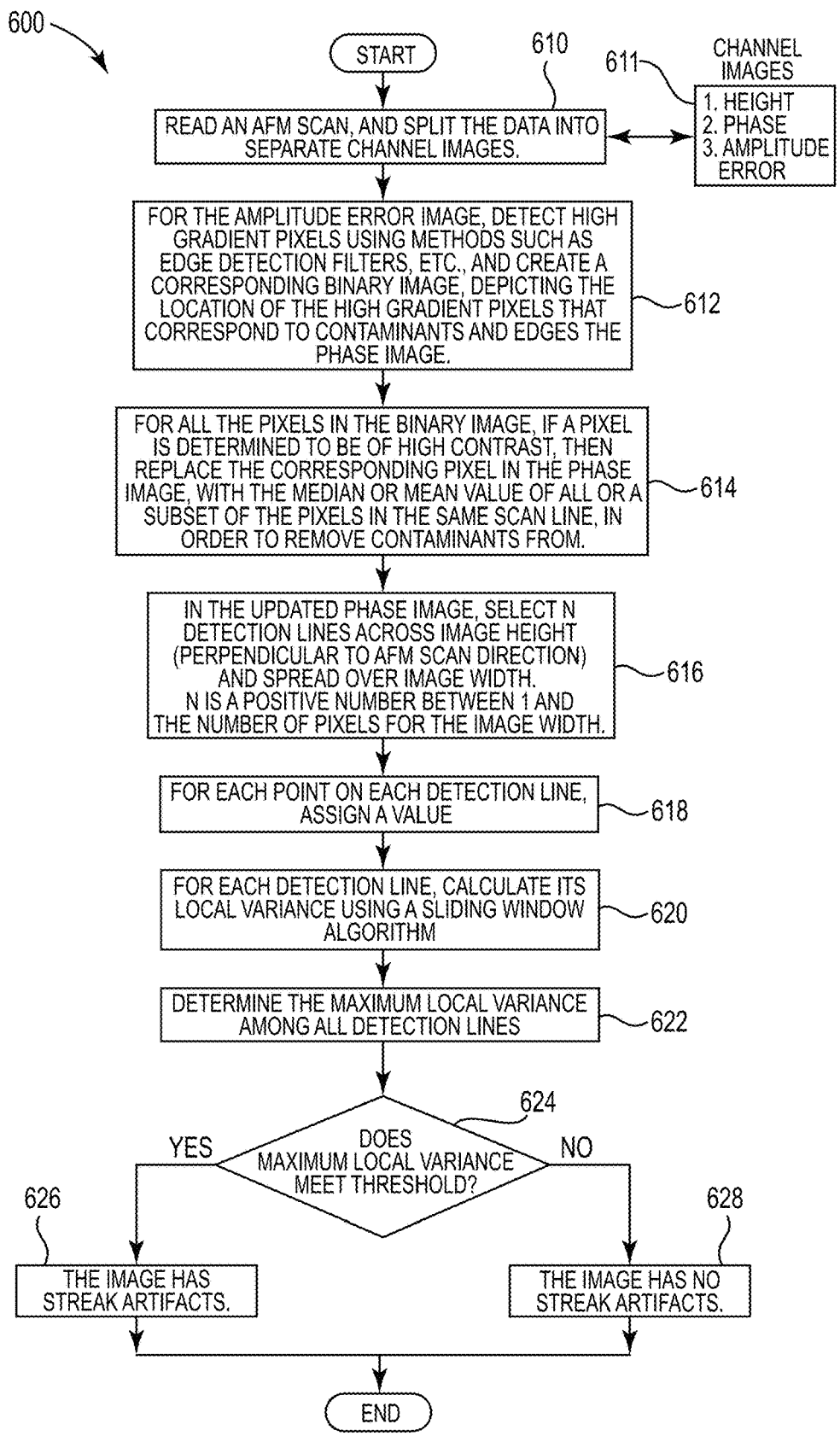
FIG. 6 is a flowchart of yet another process for analyzing an image, according to various embodiments.

FIG. 6 is a flowchart of yet another process 600 for analyzing an image, according to various embodiments.

According to another embodiment, a process 600 can be begin at operation 610 by reading a received (e.g., AFM) scan, and splitting the scan into at least two, but in some examples three, separate data channel scan images 611. In an example case of three data channels, the data channels can include a first data channel image including scan height/amplitude, a second data channel image including scan phase, and a third data channel image including scan (probe control) amplitude error. According to other embodiments, two data channels and images 611 can be employed. According to yet another embodiment, four or more channel images 611 can be employed, which may lead to even greater precision in artifact assessment and image analysis.

At operation 612, for the amplitude error image, the highest gradient pixels can be detected using methods such as edge detection filters, etc., and a corresponding binary image can be created that depicts and stores the locations of high gradient pixels that correspond to contaminants and edges.

At operation 614, for all pixels in the binary image grid or bitmap, if a particular pixel is either bright white (e.g., Pixel(x,y)=1), in a case where the pixel is found to be of high contrast, then the corresponding pixel in the phase image can be replaced with the median or mean value of all or a subset of the pixels in the same scan line, in order to remove contaminants from the phase image. If the particular pixel is instead found to be dark of black (e.g., Pixel(x,y)=0), then the pixel may not be selected for further assessment at this time.

At operation 616, the updated phase image is accessed, N detection lines are selected across image height (where height is perpendicular to an AFM scan direction) and spread over image width. N can be a positive integer between 1 and the number of pixels for image width. At operation 618, for each point on each detection line, a value is assigned. In one example, to detect a line at coordinates $(x_i,y)$, a median or mean of phase image $((x_i-\frac{1}{2}\text{Window-Size}):(y+\frac{1}{2}\text{WindowSize}))$, for y∈[1, image height] can be determined.

At operation 620, for each detection line, the local variance is calculated using a sliding window algorithm. In other words, local vicinities are each individually scanned in order to find local variances and areas or pixels of high contrast. In one embodiment, the following formula may be employed to find local variance for coordinates $(x_i,y)$ and a given window size "WindowSize," where a variance of detected lines is found for $(x_i,(y-\frac{1}{2}[\text{WindowSize}])$ to $(y+\frac{1}{2}[\text{WindowSize}]))$, and where a value y exists between 1, and the (e.g., vertical) image height.

At operation 622, the maximum local variance can be calculated or otherwise determined among all detection lines. For example, the maximum local variance is equal to a maximum line variance for coordinates $(x_i,y)$, for all $x_i$, and where a value y exists between 1, and the (e.g., vertical) image height.

At operation 624, it can be determined whether the maximum local variance is equal to or greater than a predetermined threshold. The threshold may be set such that a maximum local variance if it does not exceed the threshold indicates that an artifact is a streak artifact, and therefore either a harmful contaminant or an AFM apparatus related artifact. If it is determined at operation 624 that the maximum local variance is equal to or greater than the threshold, the image is determined to have no streak artifacts at operation 626. If, however, it is determined at operation 624 that the maximum local variance is not equal to or greater than the threshold, the image is determined to have at least one streak artifact at operation 628. The process 600 may then end.

Figure 7:
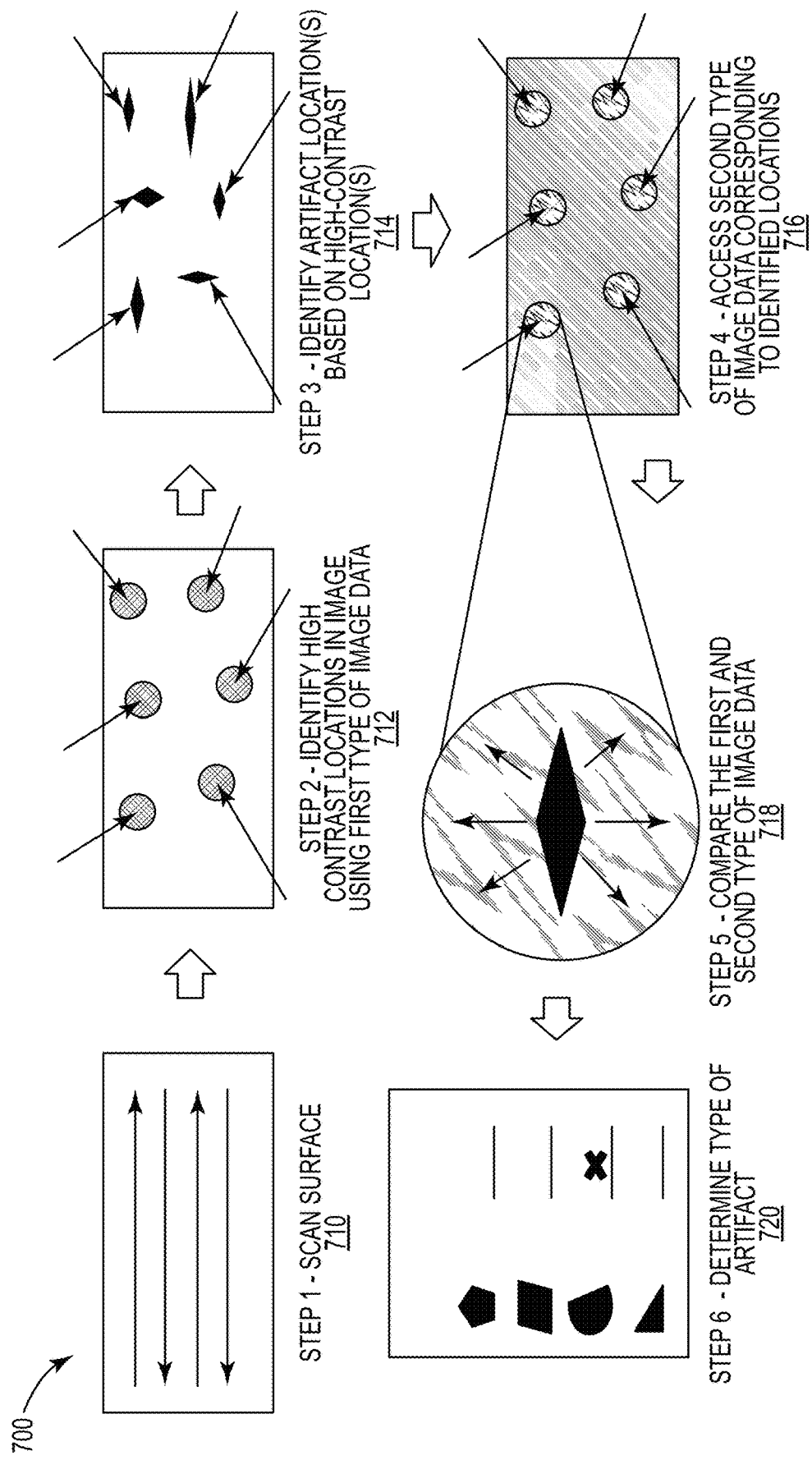
FIG. 7 shows an illustrated process for analyzing an image, according to various embodiments.

FIG. 7 shows an illustrated process 700 for analyzing an image, according to various embodiments.

As discussed, herein, the image to be analyzed can be created by various scanning techniques, such as an AFM or fast scan AFM process. Process 700 can begin at operation 710 by scanning a surface (e.g., similar to scanning of surface 220 in FIG. 2). Process 700 can continue by identifying high contrast locations in image of scanned surface using a first image data type at operation 712. High-contrast locations can be individual pixels or other image locations according to various embodiments.

Process 700 can continue by identifying artifact(s) based on high contrast location(s) at operation 714, as described herein. Process 700 can continue by accessing a second image data type corresponding to location identified at operation 716. The first and image data type used at operation 712 and the second image data type used at operation 714 can both correspond to a same image scan, and the two types of image data can correspond to various image data channels, as discussed herein.

Process 700 can continue by comparing and analyzing the first and second types of image data at operation 718. Based on the comparing at operation 718, the type of artifact can be determined at operation 720 and the process may repeat for another scan or for another part of the surface to be scanned, and the process 700 may end.

Figure 8:
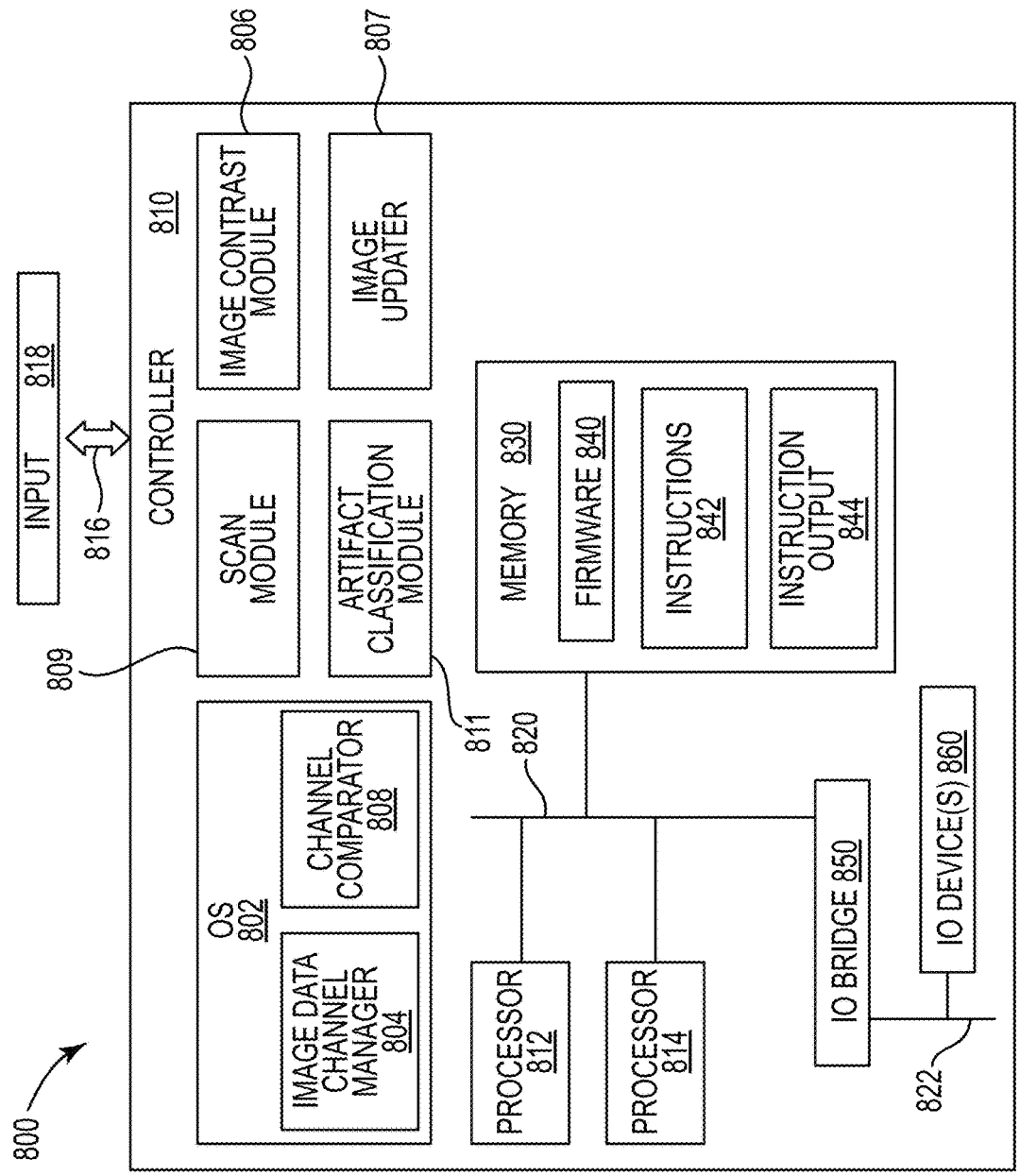
FIG. 8 is a block schematic diagram of a computer system according to embodiments of the present disclosure.

FIG. 8 is a block schematic diagram of a computer system 800 according to embodiments of the present disclosure.

Computer system 800, as shown, is configured with an interface 816 to enable controller 810 to receive a request to assess an image for artifacts and/or the type of artifact (e.g., contaminant artifact or otherwise), as described in particular with regard to FIGS. 2-7. An input 818 may be received at interface 816. In embodiments, the interface 816 can enable controller 810 to receive, or otherwise access, the input 818 via, for example, a network (e.g., an intranet, or a public network such as the Internet), or a storage medium, such as a disk drive internal or connected to controller 810. The interface can be configured for human input or other input devices, such as described later in regard to components of controller 810. It would be apparent to one of skill in the art that the interface can be any of a variety of interface types or mechanisms suitable for a computer, or a program operating in a computer, to receive or otherwise access or receive a source input or file.

Processors 812, 814 included in controller 810 are connected by a memory interface 820 to memory device or module 830. In embodiments, the memory 830 can be a cache memory, a main memory, a flash memory, or a combination of these or other varieties of electronic devices capable of storing information and, optionally, making the information, or locations storing the information within the memory 830, accessible to a processor. Memory 830 can be formed of a single electronic (or, in some embodiments, other technologies such as optical) module or can be formed of a plurality of memory devices. Memory 830, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 800 can include a plurality of memory devices. A memory interface, such as 820, between a one or more processors and one or more memory devices can be, for example, a memory bus common to one or more processors and one or more memory devices. In some embodiments, a memory interface, such as 820, between a processor (e.g., 812, 814) and a memory 830 can be point to point connection between the processor and the memory, and each processor in the computer 800 can have a point-to-point connection to each of one or more of the memory devices. In other embodiments, a processor (for example, 812) can be connected to a memory (e.g., memory 830) by means of a connection (not shown) to another processor (e.g., 814) connected to the memory (e.g., 820 from processor 814 to memory 830).

Computer 800 can include an input/output (I/O) bridge 850, which can be connected to a memory interface 820, or to processors 812, 814. An I/O bridge 850 can interface the processors 812, 814 and/or memory devices 830 of the computer 800 (or, other I/O devices) to I/O devices 860 connected to the bridge 820. For example, controller 810 includes I/O bridge 850 interfacing memory interface 820 to I/O devices, such as I/O device 860. In some embodiments, an I/O bridge can connect directly to a processor or a memory, or can be a component included in a processor or a memory. An I/O bridge 850 can be, for example, a peripheral component interconnect express (PCI-Express) or other I/O bus bridge, or can be an I/O adapter.

An I/O bridge 850 can connect to I/O devices 860 through an I/O interface, or I/O bus, such as I/O bus 822 of controller 810. For example, I/O bus 822 can be a PCI-Express or other I/O bus. I/O devices 860 can be any of a variety of peripheral I/O devices or I/O adapters connecting to peripheral I/O devices. For example, I/O device 860 can be a graphics card, keyboard or other input device, a hard disk drive (HDD), solid-state drive (SSD) or other storage device, a network interface card (NIC), etc. I/O devices 860 can include an I/O adapter, such as a PCI-Express adapter, that connects components (e.g., processors or memory devices) of the computer 800 to various I/O devices 860 (e.g., disk drives, Ethernet networks, video displays, keyboards, mice, styli, touchscreens, etc.).

Computer 800 can include instructions 842 executable by one or more of the processors 812, 814 (or, processing elements, such as threads of a processor). The instructions 842 can be a component of one or more programs. The programs, or the instructions 830, can be stored in, and/or utilize, one or more memory devices of computer 800. Memory 830 can also store one or more instruction output 844. As illustrated in the example of FIG. 8, controller 810 includes a plurality of programs or modules, such as scan module 809, artifact classification module 811, image contrast module 806, and image updater 807. A program can be, for example, an application program, an operating system (OS) or a function of an OS, or a utility or built-in function of the computer 800. A program can be a hypervisor, and the hypervisor can, for example, manage sharing resources of the computer 800 (e.g., a processor or regions of a memory, or access to an I/O device) among a plurality of programs or OSes.

Programs can be "stand-alone" programs that execute on processors and use memory within the computer 800 directly, without requiring another program to control their execution or their use of resources of the computer 800. For example, controller 810 includes (optionally) stand-alone programs in scan module 809, artifact classification module 811, image contrast module 806, and image updater 807. A stand-alone program can perform particular functions within the computer 800, such as controlling, or interfacing (e.g., access by other programs) an I/O interface or I/O device. A stand-alone program can, for example, manage the operation, or access to, a memory (e.g., memory 830). A basic I/O subsystem (BIOS), or a computer boot program (e.g., a program that can load and initiate execution of other programs) can be a standalone program.

According to some embodiments, an image data channel manager 804 and a channel comparator 808 may include various scripts that may represent programs or other functions. An example script may be a (e.g., stand-alone) program that can be run once per time image or one time per viewing area of an image.

Controller 810 within computer 800 can include one or more OS 802, and an OS 802 can control the execution of other programs such as, for example, to start or stop a program, or to manage resources of the computer 800 used by a program. For example, controller 810 includes OS 802, which can include, or manage execution of, one or more programs, such as OS 802 including (or, managing) image data channel manager 804 and/or channel comparator 808. In some embodiments, an OS 802 can function as a hypervisor.

A program can be embodied as firmware (e.g., BIOS in a desktop computer, or a hypervisor) and the firmware can execute on one or more processors and, optionally, can use memory, included in the computer 800. Firmware can be stored in a memory (e.g., a flash memory) of the computer 800. For example, controller 810 includes firmware 840 stored in memory 830. In other embodiments, firmware can be embodied as instructions (e.g., comprising a computer program product) on a storage medium (e.g., a CD-ROM, DVD-ROM, flash memory, or disk drive), and the computer 800 can access the instructions from the storage medium.

In embodiments of the present disclosure, computer 800 can include instructions for automatic image analysis and artifact classification. Controller 810 includes, for example, scan module 809, artifact classification module 811, image contrast module 806, and image updater 807, which can operate, in conjunction with image data channel manager 804 and channel comparator 808 to analyze images and classify artifacts by type within each image. The computer 800 can utilize scan module 809, artifact classification module 811, image contrast module 806, and image updater 807 in a memory 830 of the computer 800, such as controller 810 storing the image data, including data channels for an image, and perform cache clean-up and/or cache transmission control in memory 830.

The example computer system 800 and controller 810 are not intended to limiting to embodiments. In embodiments, computer system 800 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of skill in the art to include a variety of computing devices interconnected in a variety of manners in a computer system embodying aspects and features of the disclosure.

In embodiments, controller 810 can be, for example, a computing device having a processor (e.g., 812) capable of executing computing instructions and, optionally, a memory 830 in communication with the processor. For example, controller 810 can be a desktop or laptop computer; a tablet computer, mobile computing device, personal digital assistant (PDA), or cellular phone; or, a server computer, a high-performance computer (HPC), or a super computer. Controller 810 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one skilled in the art that a computer embodying aspects and features of the disclosure can be any of a variety of computing devices having processors and, optionally, memory devices, and/or programs.

It is understood that numerous variations of image analysis and processing could be made while maintaining the overall inventive design of various components thereof and remaining within the scope of the disclosure. Numerous alternate design or element features have been mentioned above.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

Although certain features are described generally herein relative to particular embodiments of the invention, it is understood that the features are interchangeable between embodiments to arrive at methods of analyzing and processing images for artifact and contaminant assessment using multiple image data channels and comparison thereof.

Reference is made herein to the accompanying drawings that form a part hereof and in which are shown by way of illustration at least one specific embodiment. The detailed description provides additional specific embodiments. It is to be understood that other embodiments are contemplated and may be made without departing from the scope or spirit of the present disclosure. The detailed description, therefore, is not to be taken in a limiting sense. While the present disclosure is not so limited, an appreciation of various aspects of the invention will be gained through a discussion of the examples provided.

What is claimed is:

1. A method of analyzing an image, comprising:
receiving an image having a first scan direction, the image including at least a first sub-image containing data relating to a first image aspect and a second sub-image containing data relating to a second image aspect;
identifying at least a first pixel location based on a first gradient feature of the first sub-image;
accessing, based on the first pixel location, the second sub-image;
substituting the second sub-image for the first sub-image for the first pixel location;
analyzing, based on the accessing and substituting, an image aspect perpendicular to the first scan direction at the first pixel location;
determining, based on the analyzing, at least one local perpendicular gradient variance at the first pixel location;
identifying a maximum local perpendicular variance for the first pixel location; and
identifying an artifact at the first pixel location based on the identified maximum local perpendicular variance.

2. The method of claim 1, wherein the determining at least one local perpendicular gradient variance employs a sliding window algorithm.

3. The method of claim 1, further comprising:
identifying at least a second pixel location based on a second gradient feature of the first sub-image;
accessing, based on the second pixel location, the second sub-image;
substituting the second sub-image for the first sub-image for the second pixel location;

analyzing, based on the accessing and substituting, an image aspect perpendicular to the first direction at the second pixel location;

determining, based on the analyzing, at least one local perpendicular gradient variance at the second pixel location;

identifying a maximum local perpendicular variance for the second pixel location; and determining an overall local perpendicular variance maximum based on the first pixel location and the second pixel location.

4. The method of claim 3, further comprising:

receiving a perpendicular variance threshold; and comparing the overall local perpendicular variance maximum to the perpendicular variance threshold.

5. The method of claim 1, wherein the received image is scanned using atomic force microscopy, wherein the first sub-image relates to amplitude of the atomic force microscope image, and wherein the second sub-image relates to phase of the atomic force microscope image.

6. The method of claim 1, further comprising:

creating, in response to the identifying, a first binary image including a first pixel location based on a first gradient feature the first sub-image.

7. The method of claim 1, wherein the first gradient feature of the first sub-image is a first location of high contrast.

8. The method of claim 3, wherein the second gradient feature of the first sub-image is a second location of high contrast.

9. The method of claim 1, wherein the first sub-image corresponds to a first channel of data and the second sub-image corresponds to a second channel of data.

10. The method of claim 1, wherein the received image is an atomic force microscope image that further includes at least a third sub-image containing data relating to a third image aspect.

11. The method of claim 10, wherein the first image aspect relates to amplitude of the atomic force microscope image, the second image aspect-relates to phase of the atomic force microscope image, and the third image aspect relates to height of the atomic force microscope image.

12. The method of claim 4, further comprising:

identifying an artifact at the first pixel location based on the identified maximum local perpendicular variance.

13. The method of claim 12, further comprising:

classifying the artifact as either a) an instrument artifact or b) a contaminant artifact based on the comparing the overall local perpendicular variance maximum to the perpendicular variance threshold.

14. The method of claim 13, wherein the artifact is classified as an instrument artifact.

15. The method of claim 14, wherein upon classifying the artifact as an instrument artifact, a signal is transmitted indicating a request for replacement of an atomic force microscope probe tip.

16. The method of claim 13, further comprising, in response to the classifying the first artifact, assigning a quality rating to the image;

comparing the quality rating assigned to the image with an image quality threshold; and classifying the image in response to the comparing.

17. The method of claim 1, wherein the image relates to a surface of a slider configured for use in a hard-disk drive.

18. The method of claim 17, wherein the first gradient feature is an anomalous surface feature.

19. The method of claim 18, wherein the anomalous surface feature relates to a contaminant on the surface of the slider.

20. A method of analyzing an image, comprising:

receiving an image related to a surface of a slider for use in a hard-disk drive, the image being an atomic force microscope image having a first scan direction, the image including at least a first sub-image containing data relating to a first image aspect, a second sub-image containing data relating to a second image aspect, and a third sub-image containing data relating to a third image aspect, wherein the first image aspect relates to amplitude of the atomic force microscope image, the second image aspect-relates to phase of the atomic force microscope image, and the third image aspect relates to height of the atomic force microscope image;

identifying at least a first pixel location based on a first gradient feature of the first sub-image;

accessing, based on the first pixel location, the second sub-image;

substituting at least one of the second sub-image or the third sub-image for the first sub-image for the first pixel location;

analyzing, based on the accessing and substituting, an image aspect perpendicular to the first scan direction at the first pixel location;

determining, based on the analyzing, at least one local perpendicular gradient variance at the first pixel location; and identifying a maximum local perpendicular variance for the first pixel location.

* * * * *